United States Patent

[11] 3,613,639

| [72] | Inventors | Charles A. Lee;<br>Frank D. Sorrells, both of Knoxville, Tenn. |
|---|---|---|
| [21] | Appl. No. | 10,788 |
| [22] | Filed | Feb. 12, 1970 |
| [45] | Patented | Oct. 19, 1971 |
| [73] | Assignee | Appleton Wire Works Corporation<br>Appleton, Wis.<br>Continuation-in-part of application Ser. No. 766,755, Oct. 11, 1968, now Patent No. 3,528,227. |

[54] ANIMAL CAGE PROTECTIVE COVER AND METHOD OF MAKING SAME
9 Claims, 6 Drawing Figs.

[52] U.S. Cl. .................................................. 119/15,
55/524, 128/1, 131/10, 131/266
[51] Int. Cl. ....................................................... A01k 01/00,
B01d 39/00
[50] Field of Search ........................................... 119/15, 17,
18; 55/524, 528, 529; 128/1; 131/10, 266

[56] References Cited
UNITED STATES PATENTS

| 3,238,922 | 3/1966 | Trexler | 119/15 |
|---|---|---|---|
| 3,304,913 | 2/1967 | Nesher | 119/15 |
| 3,343,520 | 9/1967 | Schwarz | 119/15 |
| 3,528,390 | 9/1970 | Lee | 119/15 |

Primary Examiner—Aldrich F. Medbery
Attorney—Fitch, Even, Tabin & Luedeka

ABSTRACT: A protective cover for an animal cage is formed from a fibrous web material in which is incorporated a barrier media having a thermosetting resin formed into barrier areas in the fibrous web material for reducing the permeability of the fibrous web to a system of tortuous passageways and restricting the flow of air currents therethrough to a value less than that necessary to maintain contaminants airborne, thereby eliminating the transport of such contaminants into or out of such animal cage. The cover may be made by thermoforming the fibrous web into a shape to fit over and seal with the animal cage.

3,613,639
PATENTED OCT 19 1971
SHEET 1 OF 2
FIG.1
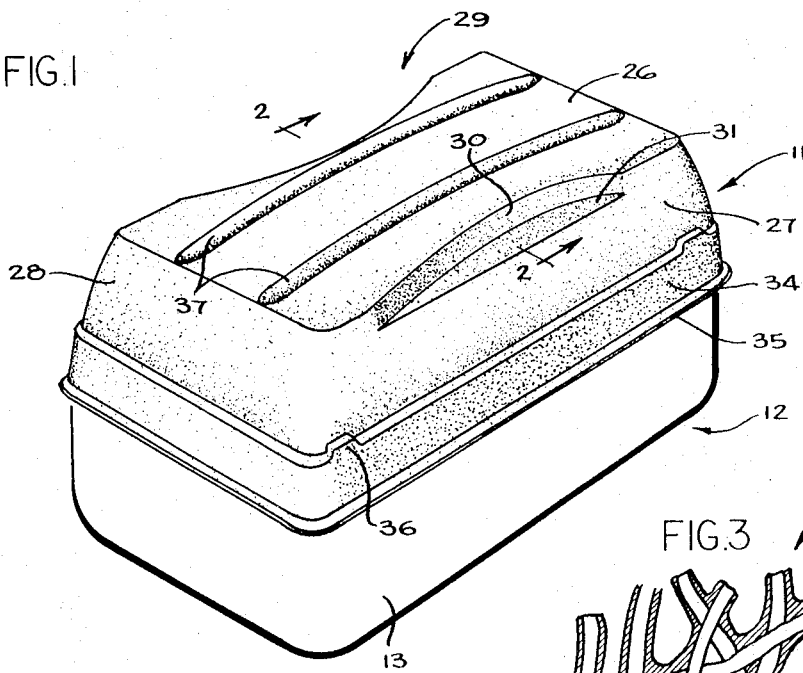
FIG.2
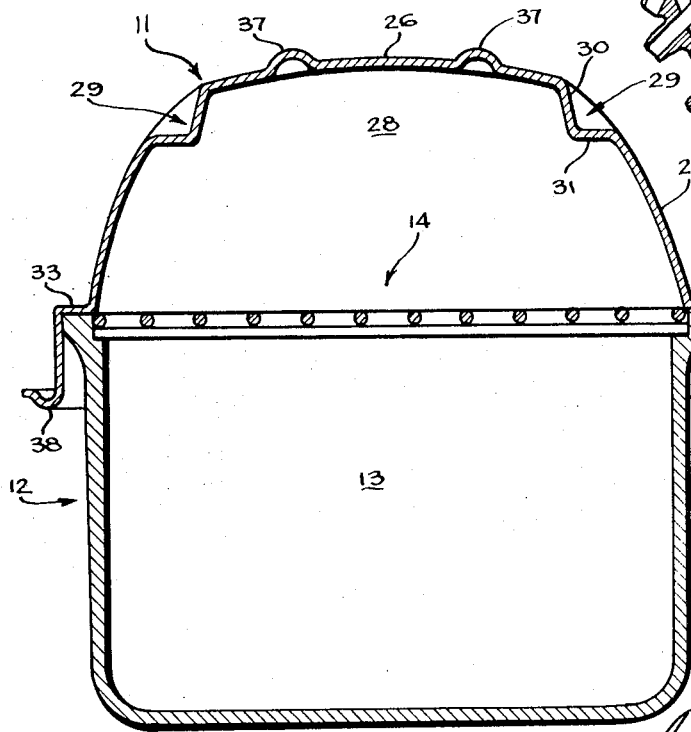
FIG.3
FIG.3A
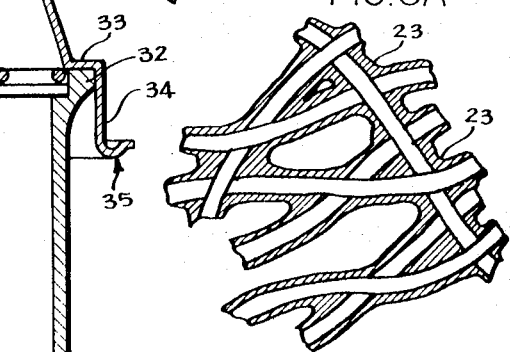
INVENTORS
CHARLES A. LEE
FRANK D. SORRELLS
Anderson, Luedeka, Fitch, Even & Tabin
ATTYS.

INVENTORS
CHARLES A. LEE
FRANK D. SORRELLS

Anderson, Luedeka, Fitch, Even, & Tabin
ATTYS.

ANIMAL CAGE PROTECTIVE COVER AND METHOD OF MAKING SAME

This application is a continuation-in-part of copending application of Charles A. Lee and Frank D. Sorrells, Ser. No. 766,756, now U.S. Pat. No. 3,528,227, entitled "Protective Animal Cage Cover" filed Oct. 11, 1968. This invention relates in general to a cover for protecting animals in animal cages against diseases carried by airborne contaminants and to the method of making the protective cover. The present invention is also related to the protective cover disclosed in copending application of Charles A. Lee entitled "Filter-Type Animal Cage Cover", Ser. No. 766,866 filed Oct. 11, 1968 now U.S. Pat. No. 3,528,390.

Present day large scale experimental research requires large colonies of animals such as mice, rats or the like to be born, raised and housed in cages within enclosed buildings. To efficiently house such large numbers of animals, they are usually housed in animal cages which are conveniently stacked in tiers and rows. This close proximity of animals renders them particularly susceptible to infectious diseases, which may wipe out colonies of such animals and cause the loss of very expensive and valuable research.

Mice and other animals may be very active and, as they walk and scratch and move about in their cages, bits of food, hair and other refuse may be knocked from their particular cage into another cage or workspace and contaminate other animals. Also, such animal activity may result in small particles of dust, excrement or other material containing viruses or bacteria becoming airborne and transported by air currents to cause infection of the colonies.

Attempts have been made to contain airborne contaminate in the cages as well as to prevent the entry of contaminants from the ambient atmosphere into the cage. For instance, fiber glass mats have been secured to the tops of the cages in an attempt to filter dust and other particles from the air and this procedure has resulted in some success in filtering the larger sized particles from the air. However, airborne virus, bacteria and other small particles passed through the fiber glass mat and infected animals in the cages. Moreover, such fiber glass covers were uncomfortable to handle because of the tendency of such fibers to become embedded in the hands of the persons handling the covers. Also, the covers were not sufficiently rugged to withstand the repeated handling which is required in use.

In an attempt to filter very small particles and viruses from air entering cages, covers have been made with extremely fine pores or openings between microfine fibers to prevent passage of viruses and the like through a filtering action. Specifically, U.S. Pat. No. 3,343,520 discloses a filter cover for the purpose of filtering viruses, bacteria and very small particles from air entering the cages. However, covers of this type are not rugged and are not adapted to repeated use as well as having other disadvantages. The covers described in the above-identified copending applications have proved successful in protecting animals within cages against airborne contaminants including viruses, bacteria and other very minute particles transporting the same. These covers effectively prevent the passage of disease-bearing contaminants and yet are sufficiently permeable to air to provide the necessary oxygen level and, at the same time, permit the dissipation of heat, humidity and carbon dioxide. The covers are sufficiently rugged to withstand repetitive handling and are relatively nonirritating to the skin of persons handling the cover.

As will be pointed out, the preferred form of the protective covers are made with synthetic resin filaments or fibers, such as polyester fibers; and if sterilized by steam autoclaving at a temperature of about 250° F. at pressures up to 20 p.s.i., the dimensions of the untreated fibers or filaments change. As a result, the protective covers which were self-sustaining at ordinary room temperatures become nonself-sustaining and experience shrinkage and may even deform and collapse. Moreover, after autoclaving, the permeability of the covers may change and the protective covers may deform and no longer be capable of sealing tightly with a cage to prevent the leaking of airborne contaminants into the cage.

The problem of maintaining dimensional stability for the protective cover is particularly difficult when the shaped covers are formed from flat sheets of material by stretching and molding the fibrous web at elevated temperatures. After experiencing such stretching during molding, the cover material is particularly susceptible, because of the "memory" of the fibers, to deformation and collapsing at the elevated temperatures encountered in autoclaving. Complicating the problem of stabilizing such protective covers is the requirement that sufficient narrow tortuous passageways between the fibers must remain open and unclogged to provide the proper ventilation and protection against contamination.

The illustrated methods of forming protective covers in each of the copending applications includes the step of adhering thermoplastic particles in a multilayered fibrous web to form tortuous passageways for air and to reduce the air permeability of the fibrous web to within a desired range. The tortuous passageways and controlled permeability prevented ambient air movements or currents from passing through this cover material with sufficient velocity to transport contaminants through it. This cover material with the thermoplastic particles was then configured into desired shape by a molding or thermoforming operation. Following this, the cover may be coated with thermosetting resin to stabilize the fibers and thermoplastic particles to withstand temperatures encountered with sterilization by autoclaving.

In accordance with the present invention, a protective cover having the controlled permeability and tortuous passageways is formed without the necessity of adhering thermoplastic particles in the fibrous web. This is achieved in the present invention by first thermoforming a fibrous web to shape providing, in effect, a cover blank and then applying a barrier media having a thermosetting resin which, when cured, will substantially reduce the air permeability and create nodular formations or interrupted areas in the cover serving as baffles or barriers in the fibrous web thereby resulting in the tortuous passageways. Also, as will be explained, the preferred thermosetting resin stabilizes the cover against collapsing or deforming from autoclaving.

Accordingly, an object of the invention is to provide a cover of the kind described above. Another object of the invention is to provide protective covers of the type described which may be sterilized by autoclaving and then reused as a protective cover.

Other objects and advantages of the invention will become apparent from the detailed description taken in connection with the accompanying drawings in which:

FIG. 1 is a perspective view of an animal cage having a protective cover embodying various of the features of the invention;

FIG. 2 is an enlarged sectional view taken substantially along the line 2—2 of FIG. 1;

FIG. 3 is an enlarged, diagrammatic cross-sectional illustration of a cover material for the protective cover;

FIG. 3A is an enlarged sectional view taken substantially along line 3A—3A of FIG. 3.

Figure 4:
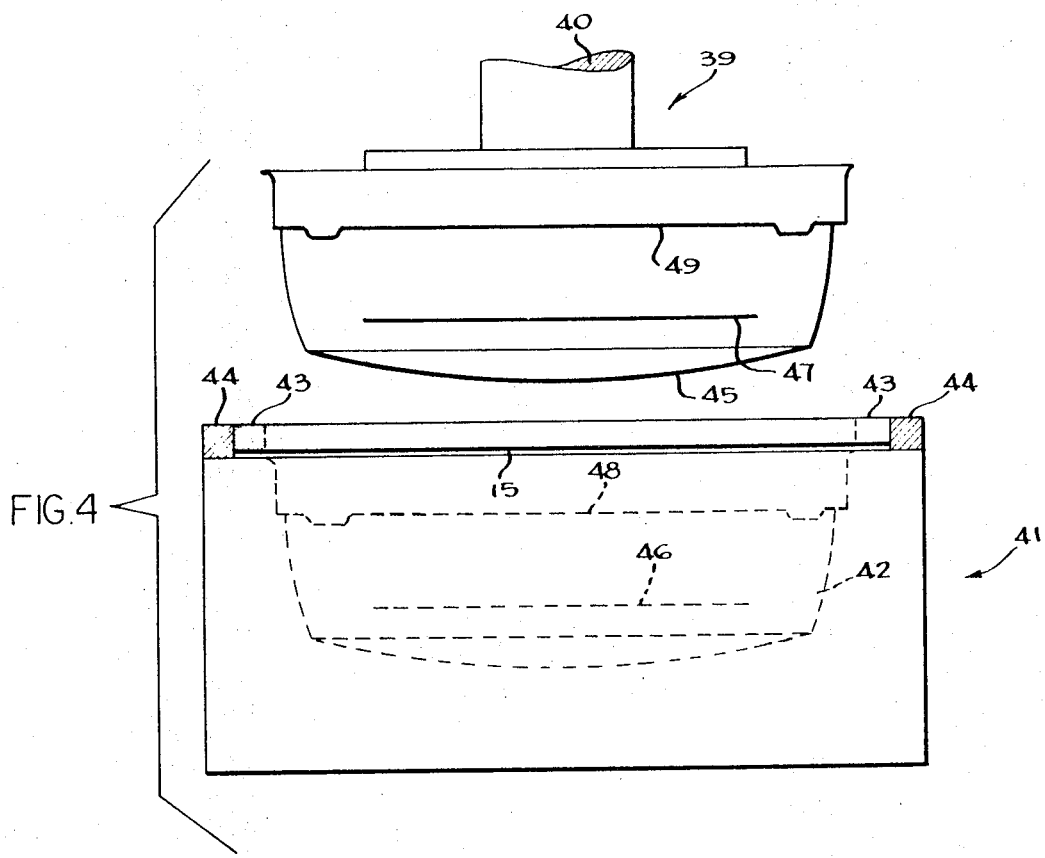
FIG. 4 is a diagrammatic view of an apparatus for molding the cover material into the protective cover illustrated in FIG. 1.

As shown in the drawings (FIGS. 1 and 2) for the purposes of illustration, a protective cover 11 embodying various features of the invention is seated on and covers the open top of a cage 12 which includes a lower housing or pan 13 in the interior of which the laboratory animals are confined. The cage also includes a grate 14 formed of cross strips of metal or plastic across the top of the pan 13 to prevent escape of the animals from the pan.

As will be explained in greater detail, the protective cover 11 is made with a controlled permeability to air for the purpose of effectively preventing any air currents or air movement into the cage to attain a sufficient velocity to transport contaminants into or from the interior of the cage 12. The cover is formed from a fibrous web material, the fibers of which are matted together and are treated to define tortuous air passageways which serve to lower velocity of air currents to the point where airborne contaminants cannot be supported. While the prior art has employed fine fibers and very small openings between fibers in an attempt to filter such particles, the protective cover of the present invention may use larger diameter, less expensive fibers, e.g., 3- or 4 -denier polyester fibers, and larger openings between fibers so long as the transport velocity of any air currents attempting to pass through the protective cover 11 is effectively reduced by the various changes in direction caused by the tortuous passageways.

As will be pointed out in greater detail, the cover 11 is provided with a barrier media 23 which provides a decrease in permeability which even further reduces the air currents in a controlled manner to provide optimum results. In the preferred embodiments of the invention, the barrier media 24 is in the form of a synthetic thermosetting resin which, when polymerized, forms three-dimensional nodular formations 54 including resin disposed at the multitudinous fiber crossings and bridging the fibers. These nodular formations are highly irregular in their individual geometries. Many possess substantial dimension in two or more directions with their dimensional orientations occuring randomly throughout the cover. These nodular formations of the barrier media form baffles or barriers in the fibrous web to cause air moving through the cover to deflect and change direction and severely limit the transport velocity of airborne contaminants attempting to pass through the cover.

The barrier media 23 is efficaciously applied to a cover blank 24 thermoformed from a flat sheet of fibrous material 15. In the embodiment shown in FIG. 3, the sheet of fibrous material 15 is a two-ply construction comprised of a pair of fibrous webs 17 and 18 each of which has an initial air permeability, e.g., prior to application of the barrier media of approximately 120 c.f.m., per ft.$^2$ at ½-inch $H_2O$ pressure differential as measured by a Frazier air permeability tester. The cover webs 17 and 18 are formed into the desired shape by a thermoforming process in which the cover webs are stretched while in a heated condition during formation of the protective cover shape. The fibers attenuate during forming of the cover and the average air permeability for the cover blank increases significantly from that of the raw webs. Subsequently, the configured cover blank 24 receives an application of the barrier media which sufficiently lowers its air permeability to the desired range, e.g., an average permeability to air at a ½-inch $H_2O$ pressure differential of about 60 to 150 c.f.m. per square foot for typical environments. Air permeabilities in excess of 150 c.f.m./ft.$^2$ inch $H_2O$ pressure differential may be used in environments less subject to drafts and air currents and air permeabilities of less than 60 c.f.m./ft.$^2$ may be used where the animal food does not readily deteriorate with humidity.

Because at ambient room conditions no appreciable pressure differential exists between the inside and outside of the cover (in any event, much less than the ½-inch water pressure differential used in described tests) and also because of the very wide areas afforded by the protective cover for the passage of air into and from the animal cage 12, the transport velocity of the air carrying virus, bacteria or other very small sized contaminants is reduced by the cover to the point that airborne contaminants attempting to pass through the tortuous passageways of the fibrous webs tend to drop out and become trapped in the cover. On the other hand, the volume of air needed to ventilate the cage is adequately provided by air movement through the large number of passages found in the wide expanse of cover. Thus, the humidity, temperatures and carbon dioxide levels in the cage are essentially the same on both the inner and outer sides of the protective cover 11 except during periods of intense animal activity which usually are of limited duration.

Referring now in greater detail to the cover material 15 for the protective cover 11, the base fibrous webs 17 and 18 or if the cover is to be formed from a single web, the single web is made form various kinds of filaments or fibers of synthetic materials. In this connection, rayon, nylon, vinyl derivatives, polyethylene, mineral fibers, and the like are contemplated. The fibrous base web may be formed to have acceptable characteristics by processes such as air forming, water forming or mechanical spreading to obtain the desired strength, uniform density and permeability. These processes are generally well known in the prior art.

The preferred base web is formed from a large number of staple length fibers, i.e., three-eighths inch or longer in length, or from continuous filaments randomly disposed in mat form with the filaments being bonded or interentwined with one another at a relatively large number of spaced points so as to provide a coherent and strong web having bonds extending substantially throughout the width, depth and length of the web. The preferred filaments are formed of polyester and are formed into a web by a spunbonded process in which continuous filaments are spun from spinnerettes into a web and are heat-sealed to one another at a relatively large number of spaced points throughout the web. As desired, additional bonding may be obtained by embossing the web with the simultaneous application of heat as by disposing heated embossing heads on opposite sides of the web with opposed heads being in register and then advancing the registered heads toward each other.

This action may also serve to press or push outer filaments from opposite surfaces of the web inwardly where they become bonded to each other thereby creating multiple spaced bonds between the outer surfaces through the thickness of the web. As the filaments are randomly oriented and have a large number of bonds between the filaments at their crossing points throughout the depth of the web, the latter has good strength and resistance to tearing and separating the filaments in the molding of the web into the shape of the protective cover.

A preferred web is a spunbonded, nonwoven web of crinkled, continuous filaments of polyester of approximately 3 or 4 deneir (0.7 to 0.8 mils in diameter) of the kind sold under the trademark REEMAY by E. I. duPont de Nemours of Wilmington, Del. These webs range in weight from about 1.5 oz./yd.$^2$ to 6 ozs./yd.$^2$ with the 6 ozs./yd.$^2$ weight of web being preferred. The polyester filaments are preferred as they are highly resistant to the effects of heat and do not melt at temperatures below about 480° F. as contrasted to much lower temperatures for many other synthetic fibers. These 6 ozs./yd.$^2$ spunbonded webs are quite open and permeable and have air permeabilities of 105 to 135 c.f.m. per ft.$^2$ at a ½-inch $H_2 O$ pressure differential as measured by a Frazier air tester. In contrast to the prior art very thick and open filter media, the preferred webs are quite thin, usually about 10 to 35 mils in thickness and are relatively dense.

The preferred form of barrier media 23 forms nodular formations or interrupted areas which not only serve to block high-velocity airflow through a cover, but also serve to intimately and uniformly bond the two webs 17 and 18 together should the cover be formed of a two-ply construction. The preferred barrier media includes a thermosetting resin and a conditioning agent which promotes the ability of thermosetting resin to bridge across the pores or air spaced between fibers and to create nodular formations areas, which serve as impermeable or substantially impermeable baffles or barriers for air within the web. These nodular formations are generally discrete, separated from each other, and vary greatly in size. Many are generally three-dimensional; many are generally planar and many are oriented such that the air flowing past them is diverted in a direction other than along a straight path through the thickness of the cover. The formations, however, do not extend over the full face or side of the cover 11 as would render the cover impermeable. While the barrier media coats the fibers and enlarges the diameters thereof, this coating action is thought not to be primarily responsible for the substantial decrease in permeability for the cover. For example, when the preferred resin is used without the conditioning agent, it merely coats the fibers but does not enlarge the fibers sufficiently to reduce the air permeability of the cover blank 24, as does this same resin when the conditioning agent is added and the nodular formations are formed. The addition of the conditioning agent to the resin appears to change its interfacial characteristics with the fibers and also to change other of its physical characteristics such a providing an increased viscosity and a change in surface tension. In one sense the conditioning agent acts as a film former to cause the thermosetting resin to spread as a film between fibers rather than merely coating the fibers. As will be explained, several conditioning agents have been used to cause the resin to create the nodular formations.

Particularly good results have been obtained with a barrier media comprised of a thermosetting resin, more specifically, a melamine formaldehyde resin sold under the trademark "Parez 613" by American Cyanamid and a conditioning agent used successfully is an acrylic, thermosetting resin sold under the trademark "Rhoplex HA-16" by Rohm & Hass Co. The amount of barrier media applied has been satisfactorily varied from about 90 percent to 250 percent by weight of the total weight of the base web. By adjusting the amount of barrier media applied, the permeability of the cover may be decreased to provide the desired barrier effect to air currents.

Prior to describing the method of thermoforming a flat sheet of the cover material 15 into the desired shape, the illustrated, truncated pyramid shape for the cover blank 24 and for the finished cover 11 will be described in detail. The protective cover as shown in FIG. 1 is formed with a body having an upper crowned top wall 26 and opening, integrally attached sidewalls 27 and end walls 28 which are inclined downwardly and outwardly from the top wall 26. To facilitate the gripping and handling of the protective cover 11, it is preferred to form suitable hand grips on the top of the cover by means of a pair of opposed indentations 29 in the top portion of the cover. In this instance, the indentations are defined by vertically disposed and inwardly curving walls 30 which extend downwardly and meet, at generally right angles, horizontally disposed shoulder walls 31. The walls 31 extend longitudinally for the length of the curved walls and extend outwardly therefrom to the remainder of the cover sidewall 27. The indentations 29 are spaced apart so that they are easily spanned by a hand gripping the cover between the thumb and fingers.

It is preferred that the cover 11 be provided with means to attach to and engage with a top rim 32 of the cage 12 and also that the cover be readily detachable form the rim 32 to facilitate inspection of the animals in the interior of the cage. To these ends, the lower portion of the cover end walls and sidewalls are formed with an outwardly extending, horizontally disposed ledge 33 which is adapted to rest on the top of the cage rim 32. About the lower edge of the cover is downwardly depending skirt 34 which encircles the exterior of the cage rim 32 and is disposed in close but spaced relationship to the vertical walls of the cage 12. The skirt 34 terminates in a lower, outturned edge 35. The skirt 34 may be provided with a slight taper to wedge against the cage rim 32 and thereby hold the cover against being canted to tipped and prevent direct airflow between the cover ledge 33 and the cage rim 32.

Prior to formation of the cover, flat sheets of the fibrous webs 17 and 18 are disposed face to face with an interface therebetween and are heated in a suitable oven (not shown) to a temperature sufficient to soften the fibers and/or their bonds so that the fibers can be reoriented into the desired shape. The heated cover webs 17 and 18 may be molded in a suitable molding apparatus such as the plug-molding apparatus shown in FIG. 4. In this instance, the molding apparatus includes a male plug 39 attached to the lower end of a ram 40. The plug is aligned with and disposed above a die 41 which is formed with an appropriate cavity 42 to receive the plug 39.

Prior to insertion of the plug 39 into the die 41, the sheet of cover material 15 is attached to a rectangular frame 43 by forcing the marginal edges thereof onto tenterhooks (not shown) disposed about the outer edge of the frame 43. The latter is then placed on the top of the die 41 and held against lateral shifting by suitable exterior guide blocks 44. The frame grips the marginal edge of the sheet which is later trimmed at the out-turned edge 35 of the finished protective cover 11.

The mold cavity 42 may be shaped generally complementary to the exterior walls of the protective cover 11, and the shape of the plug 39 is generally complementary to the interior walls of the protective cover 11.

A specific example of thermoforming a protective cover blank 24 from a sheet of cover material 15 will now be given for the purposes of illustration only. A rectangular sheet of cover material formed of two-ply construction of fibrous webs 17 and 18 is secured to the frame 43 and heated in an oven to a temperature in the range of about 350°–375° F. The heated fibrous webs are the then transferred to the molding apparatus and positioned in place on the top of the die 41. The ram 40 is brought downwardly to bring the plug 39 against the cover webs and to move the plug 39 further downwardly onto the die cavity 42 to form the molded shape of the cover 11. At the time of stretching and molding of the cover webs, the temperature thereof cools to within the range of about 250°–300° F. Preferably, the plug 39 is held in the die cavity 42 for about 1 minute during which the stretched and reoriented filaments became set to retain the molded shape after which the plug 39 was retracted. After retraction of the plug 39, the formed cover blank 24 is allowed to cool for sufficient time to become self-sustaining. This usually takes only several minutes.

During thermoforming, the filaments reorient and attenuate and the elongation increases the permeability in most portions of the cover 11 from the permeability of the cover material 15 prior to molding. For example, a typical flat sheet of the 6 oz./yd.$^2$ Reemay web may have substantially uniform air permeability across the entire area of the sheet of approximately 120 c.f.m./ft.$^2$ at a ½-inch H$_2$O pressure differential as measured by a Frazier air test prior to being molded. After thermoforming into a cover blank 24, the air permeability may average about 212 c.f.m./ft.$^2$ at ½H$_2$O pressure differential as measured by a Frazier air tester.

Figure 5:
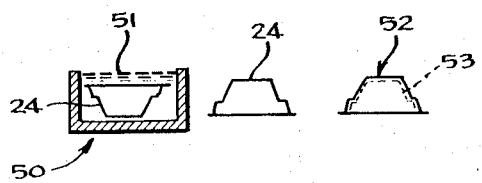
FIG. 5 is a diagrammatic illustration of a method of applying the barrier media to the cover.

After thermoforming the cover blank 24, the barrier media 23 is then applied, as will be described in connection with FIG. 5. The cover blank 24 is first submerged in a tank 50 filled with a bath 51 of barrier media for a predetermined period of time. After submersion, the cover is dried at a drying station and after drying the barrier media resin (or resins) is cured at an elevated temperature at a curing station 52 whereby the resulting cover has a reduced air permeability and tortuous passageways, and additionally becomes relatively stiff, self-supporting and resistant to shrinkage during subsequent autoclaving. As will be explained in greater detail, the cover is usually made oversize and allowed to shrink onto an open frame 53 during the curing of the resin with the result that the cover is essentially preshrunk and will exhibit only a minor shrinkage, well within tolerance limits, during subsequent autoclaving processes.

Specific examples of the protective cover made in accordance with the invention will be given for purposes of illustration only.

EXAMPLE I

A sheet of cover material 15 comprised of a fibrous web of Style 2470 Reemay weighing 6 ozs./yd.$^2$ of crinkled, 3 denier (0.7-mils diameter) polyester filaments having an average air permeability of 120 c.f.m./ft.$^2$ at a ½-inch of H$_2$O pressure differential as measured by a Frazier air tester was thermoformed into the configuration described above and as substantially illustrated in FIG. 1. This cover blank 24 has an air permeability which averaged approximately 225 c.f.m./ft.$^2$ at a ½-inch of H$_2$O pressure differential. The thermoformed cover blank 24 was then dipped in the barrier media which was prepared by mixing together 60 Percent (by volume) of Parez 613 with 40 percent (by volume) of water. To this solution there was added 5 percent (by volume) Rhoplex HA-16 acrylic resin sold by Rohm & Haas Co. and 1 percent Triton X-100, a wetting agent sold by Rohm & Haas Company.

The Parez 613 is a melamine formaldehyde resin sold by American Cyanamide which, in this instance, is sold as 80 percent solids in a liquid solution. The percentage of water added depends upon the manner of curing and also upon whether or not the cover being submerged into material is made from a single-ply or a two-ply cover material. A suitable viscosity for the barrier material is 18 centipoises as measured by a Brookfield LVT Viscometer, Brookfield Engineering Laboratories, Inc., Stoughton, Mass. using a 03 spindle at 60 r.p.m. and ambient room conditions.

It is found that best results are obtained by controlling the time period of submersion (i.e., by dipping) in the thermosetting resin-containing barrier material. It has been found that considerable increases in time may interfere with the permeability characteristics of the cover. Submersion for 10 seconds has been found sufficient in the present example.

After submersion in the barrier media bath 51, the covers are removed and allowed to air dry for a period of 16 to 24 hours at ordinary room temperatures. The period of air drying has been successfully reduced in some instances to 5 to 6 hours by the addition of a suitable catalyst to the thermosetting resin solution. A suitable catalyst for the melamine formaldehyde mixture is 0.1 percent aluminum chloride by weight of the total weight of the mixture. Alternatively, the air drying time can be reduced to 2 hours if the covers are dried by hot air at a temperature of about 150° F.

After the air drying, the covers are placed in a curing chamber such as an oven for the final cure of the thermosetting resin in the cover. Care is taken during the final curing operation to limit and control the final cover shape and the amount of shrinkage of the cover. Prior to receiving the final cure in the oven, the air dried oven which is oversized, is placed on a smaller relatively open, rigid wire form or mold 53 (FIG 5) which permits complete air circulation about the cover during curing of the thermosetting resin. The wire mold is preferably made of stainless steel bars which will withstand corrosion and chemical action when exposed to high temperatures, moisture and resins. The bars are placed at locations at which the cover dimensions must be sized, e.g., the width and length dimensions along the cover rim which seals with the cage rim. Also, the height of the cover is controlled by bars so that the cover will fit over feeding bottles (not shown) which may be inserted in the cage to feed the mice. During the final cure of the thermosetting resin, the cover material shrinks form its oversized state to the precise dimensions provided by the wire mold. The once flexible cover becomes relatively rigid and any wrinkles in the cover are removed as a result of shrinkage during the final cure so that the finished cover material is smooth and unwrinkled in appearance.

The preferred curing temperature for the thermosetting resin mixture of melamine formaldehyde of this example applied to a two-ply 6 oz. cover material is at a temperature of about 375° F. for a period of about 50 minutes. Other resin formulations, such as that described in example IV hereinafter may be cured in 15 minutes at 395° F.

The percentage weight increases due to accretion of the dried, cured preferred barrier media for the one-ply 6 oz. cover blank 24 preferably is on the order of 100 percent to 200 percent of the original dry weight of the thermoformed cover blank prior to dipping in the barrier bath. The air permeability for the cover averages about 70–120 c.f.m./ft.$^2$ at ½-inch H$_2$O pressure differential as measured by a Frazier air tester. To test the ability of this cover to withstand autoclaving, it was subjected to three autoclaving cycles of 30 minutes each at 250° F. steam and 20 p.s.i. The cover retained its shape and dimensions and its average air permeability was not appreciably reduced.

A single ply cover blank formed as in this example, having an air permeability after thermoforming of 232 c.f.m./ft.$^2$ and dipped in a barrier media comprised of 60 Percent (by volume) Parez 25 percent Rhoplex HA-16, 40 percent water and 1 percent Triton X-100 after curing, exhibited an average air permeability of about 59 c.f.m./ft.$^2$, indicating about 80 percent reduction in air permeability or about 20 percent greater reduction in air permeability due to the additional conditioning agent employed.

EXAMPLE II

A flat sheet of cover material formed of a 6 oz./yd.$^2$ web of spunbonded polyester filaments of 3 denier was thermoformed into the shape of a raw cover blank 24 as described above.

The cover blank 24 was dipped into a barrier media containing an inert, particulate filler, e.g., is finely powdered clay for a period of 10 seconds. The proportions of the barrier media 51 were 50 percent by volume (of the total) of water and 50 percent Parez 613 melamine formaldehyde, by volume (of the total), 15 percent by volume (of the total) of Georgia Kaoline powdered clay and 1 percent by weight of Triton X-100 wetting agent. The clay is mixed and held in suspension in the barrier media bath and functions as the conditioning agent in lieu of the Rhoplex acrylic resin described in example I. A suitable viscosity for this composition is 30 centipoises (Brookfield LVT Viscometer using 03 spindle at 60 r.p.m.). A satisfactory clay is Georgia Kaolin, Grade KCS, available form Georgia Kaolin, Elizabeth, N.J., having a particulate size of 80–82 percent finer than two microns. The thermosetting resin attached the inert filler clay to the fibers. As the barrier mixture did not contain any catalyst, the cover was air dried for 17 hours at ambient room conditions. After air drying, the cover was placed on a wire mold, sized as in example I and inserted into an oven and cured at 350° F. for 45 minutes. The cover was weighed before being dipped into the barrier media and was weighed after the barrier media had been cured and dried. The accretion of barrier media was found to be 127 percent of the original weight of the cover prior to dipping into the resin mixture.

The cover was washed in an industrial washer for a number of cycles and was autoclaved at 250° F. with steam at 20 p.s.i. for several cycles. The amount of dimensional shrinkage due to the percent was found to be approximately 1 percent which was well within the tolerance limits needed for sealing with the animal cage. The limiting of the subsequent shrinkage of the cover is achieved by the size of the wire mold and holding the temperature of cure higher than the temperatures to be experienced during autoclaving or washing.

The air permeabilities tested over various portions of the cover were found to be within the desired range of 60–150 c.f.m. per square foot at a ½-inch H$_2$O pressure differential as measured by a Frazier air test.

EXAMPLE III

A satisfactory single-ply cover has been formed using the foregoing methods of thermoforming and curing with a barrier media having a conditioning agent which is a mixture of Rhoplex acrylic resin and Georgia Kaolin clay.

The barrier mixture was formulated on a volume basis as follows:
60 percent Parez 613
40 percent water
To the above, 5 percent Rhoplex HA-16 was added.
To the above, 1 percent Triton X-100 was added.
To the above, 5 percent of clay was added.

Other covers were made with a barrier media having 10 percent rather than 5 percent clay, as in example III, and the permeability of the cover blank 24 averaged 218 c.f.m./ft.$^2$ and the finished cover averaged about 80 c.f.m./ft.$^2$ at ½-inch H$_2$O pressure differential. After autoclaving as above, the cover was still satisfactory.

EXAMPLE IV

A two-ply cover blank was formed as in example I. Its air permeability after thermoforming and prior to dipping in a barrier media was 180 c.f.m./ft.$^2$ at ½-inch $H_2O$ pressure differential. The thermoformed blank was dipped in a barrier media prepared by mixing 25 percent (by volume) Parez 613 with 50 percent water, 25 percent Rhoplex HA-16 and 1.0 percent Triton X-100.

After curing of the barrier media, the air permeability of the cover was 129 c.f.m./ft.$^2$, indicating that the air permeability of the cover may be adjusted by varying the percentage of Parez 613 resin in the barrier media. Such is less desirable, however, than adjusting the air permeability by selecting the percentage of conditioning agent for the reason that changes in the relative quantity of Parez 613 resin can create manufacturing problems, such as poor release of the cured cover from its drying or curing mold 53.

Fiber glass mats, heretofore, unacceptable for use in animal cage covers, may be employed in the manufacture of the cover of the present invention for the reason that the individual fibers of such mats are coated by the resin and, upon curing of the resin, become adhered in place so as not to become detached to penetrate the hand, etc. of technicians during handling of the cover. Accordingly, it is contemplated that fiber glass mats comprised of relatively long bonded or interentwined fibers as described hereinbefore may be employed in the present invention.

From the foregoing, it will be seen that protective covers have a thermosetting resin applied in a manner to provide the controlled permeability and tortuous passageways for the cover. Preferably, the thermosetting resin coats the fibers and additionally bridges between fibers to create nodular formations which serve as baffles or barriers to air currents flowing into the cover. Also, it is preferred to cure the thermosetting resin at a temperature higher than the temperatures to be encountered during washing and the cover is preshrunk during curing. Finally, the cover has been clinically tested with good results.

Thus, it will be seen that the present invention provides a new and improved cover which has an air barrier for assuring that the velocity of air passing through the cover is at a very low velocity and which has tortuous passageways to cause the air to deflect and change directions whereby the airborne viruses or particles drop out within the cover. The protective cover is capable of being manufactured by molding processes and may be made at sufficiently low cost so as to complete with and to replace the covers of the prior art. While a preferred embodiment has been shown and described, it will be understood that there is no intent to limit the invention by such disclosures but, rather, it is intended to cover all modifications and alternate constructions falling within the spirit and scope of the invention as defined in the appended claims.

What is claimed is:

1. A protective cover for an animal cage comprising a body to fit on said cage, said body including at least one web formed of matted, randomly oriented fibers of at least staple length with interconnecting voids between fibers and having passageways for the passage of air, and a barrier media in said web including a thermosetting resin formed into barrier areas in said web bridging fibers and forming in said web around said fiber tortuous passageways which reduce the transport velocity of air at ambient conditions and change substantially the air permeability of said web to within a predetermined range of air permeabilities so that airborne contaminants will not be borne through said cover by air currents.

2. A cover in accordance with claim 1 in which said barrier media includes a conditioning agent mixed with said thermosetting resin to cause the latter to spread laterally between contiguous fibers in said fibrous web and form said barrier areas when polymerized.

3. A cover in accordance with claim 2 in which said conditioning agent is another thermosetting resin for changing the interfacial characteristics of said first-mentioned thermosetting resin from coating fibers to also bridging between fibers in said web.

4. A cover in accordance with claim 3 in which said conditioning agent is an acrylic resin.

5. A cover in accordance with claim 2 in which said conditioning agent is a particulate, inert filler.

6. A cover for an animal cage comprising a first web formed of matted long, randomly oriented filaments having passageways between filaments for the passage of air, a second web disposed in face-to-face engagement with said first web at an interface and also formed with matted long, randomly oriented filaments having passageways between filaments for the passage of air, and a bonding and barrier media including a thermosetting resin for laminating said webs at said interface, said thermosetting resin being polymerized to form interrupted barrier areas between filaments within the web and on the exterior surfaces of the webs resulting in tortuous passageways for air attempting to pass through the cover so that the transport velocity of air at ambient conditions through the cover is insufficiently to carry contaminants through said cover.

7. A cover in accordance with claim 6 in which said bonding and barrier media includes a conditioning agent for assisting said thermosetting resin in spreading to block passageways in said webs.

8. A method of making a protective cover comprising the steps of providing a fibrous sheet having a plurality of passageways therein, thermoforming said fibrous sheet to a predetermined shape, applying a liquid barrier media to said thermoformed sheet and polymerizing said barrier media to form barrier areas between filaments within the web and forming tortuous passageways so that the air permeability of the web is reduced to where the transport velocity of air is insufficient to carry contaminants through said cover.

9. A cover for an animal cage comprising a first web formed of matted, long, randomly oriented filaments having multitudinous filaments crossings and passageways between filaments for the passage of air, a second web disposed in face-to-face engagement with said first web at an interface and also formed with matted, long, randomly oriented filaments having multitudinous filament crossings and passageways between filaments for the passage of air, and a bonding and barrier media including a thermosetting resin for laminating said webs at said interface, said thermosetting resin being polymerized to form nodular formations at said filament crossings in the respective webs, said nodular formations constituting baffles for air attempting to pass through the cover to cause the air to deflect and to change direction thereby limiting the transport velocity of airborne contaminants.

UNITED STATES PATENT OFFICE
CERTIFICATE OF CORRECTION

Patent No. 3,613,639                    Dated  October 19, 1971

Inventor(s) Charles A. Lee and Frank D. Sorrells

It is certified that error appears in the above-identified patent and that said Letters Patent are hereby corrected as shown below:

Column 1, line 3, "766,756" should be --766,755;
Column 1, line 6, "This invention relates in general to a cover........" should begin a new paragraph;
Column 1, line 53, sentence beginning "The covers described in the above-identified copending application...." should begin a new paragraph;
Column 3, line 8, "3- or 4 -denier" should read --three or four denier--;
Column 3, line 18, "24" should be --23--;
Column 3, line 47, "sufficiently" should be --significantly--;
Column 4, line 57, "a" should be --the--;
Column 4, line 63, between "formations" and "areas" an --or-- should be inserted;
Column 5, line 8, "a" should be --as--;
Column 5, line 60, "to" should be --or--;
Column 6, line 18, "the" (first occurrence) should be deleted;
Column 6, line 21, "onto" should be --into--;
Column 6, line 71, "has" should be --had--;
Column 7, line 9, --the-- should be inserted before "material";
Column 7, line 13, "03" should be --#3--;
Column 7, line 37, "oven" should be --cover--;(second occurrence)
Column 7, line 50, "form" should be --from--;
Column 8, line 2, "Parez 25 percent Rhoplex HA-16," should be --Parez 613, 25% Rhoplex HA 16,--;
Column 8, line 16, "is" should be --a--;
Column 8, line 22, "Kaoline" should be --Kaolin--;
Column 8, line 27, "03" should be --#3--;
Column 8, line 45, "percent" should be --autoclaving--;

Claim 6, column 10, line 32, "insufficiently" should be --insufficient--.

Signed and sealed this 9th day of May 1972.

(SEAL)
Attest:

EDWARD M.FLETCHER,JR.              ROBERT GOTTSCHALK
Attesting Officer                  Commissioner of Patents